Sept. 30, 1969   D. E. BURROUGH ET AL   3,469,381
HYDRAULIC DRIVE AND CONTROLS FOR A SELF-PROPELLED WINDROWER
Filed Dec. 9, 1966   4 Sheets-Sheet 1

D. BURROUGH
R.H. FAIRBANK
G. SOTEROPULOS

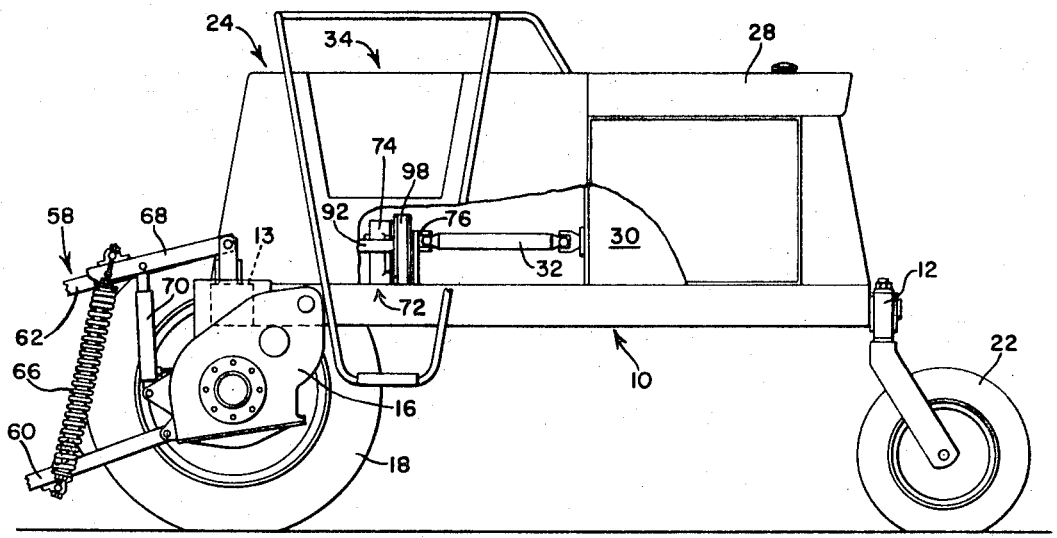
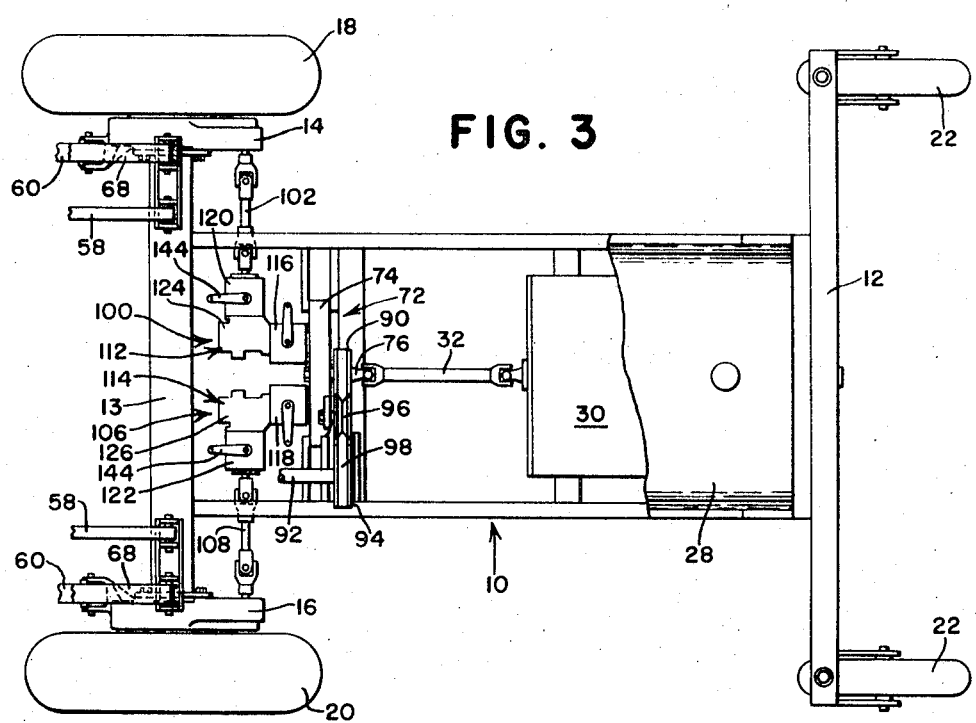

INVENTORS
D. BURROUGH
R.H. FAIRBANK
G. SOTEROPULOS

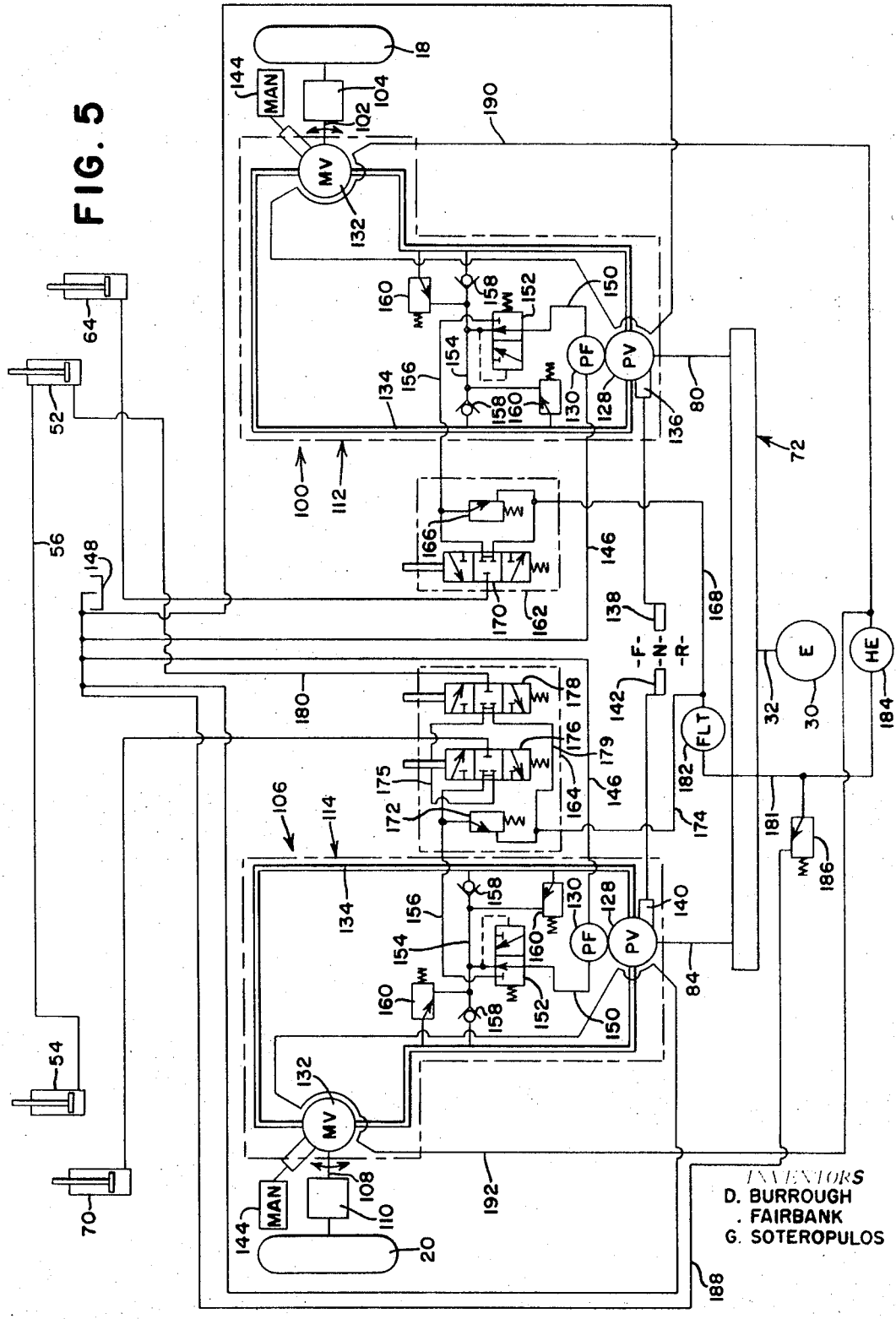

United States Patent Office 3,469,381
Patented Sept. 30, 1969

3,469,381
HYDRAULIC DRIVE AND CONTROLS FOR A SELF-PROPELLED WINDROWER
Donald E. Burrough, Raymond Harry Fairbank, and Gust Soteropulos, Ottumwa, Iowa, assignors to Deere & Company, Moline, Ill., a corporation of Delaware
Filed Dec. 9, 1966, Ser. No. 600,599
Int. Cl. A01d 69/00
U.S. Cl. 56—209                                                     14 Claims

ABSTRACT OF THE DISCLOSURE

A self-propelled windrower has right and left independently rotatable drive wheels and a forward transversely elongated harvesting platform mounted on the frame for independent vertical adjustment of its opposite ends by means of independently actuatable hydraulic cylinders. Each drive wheel is driven by the engine through a separate hydrostatic drive enclosed in an L-shaped housing and including a variable displacement pump disposed in one leg of the housing and connected to the engine by an enclosed power distribution transmission, a variable displacement motor mounted in the other leg of the housing, and a separate charge pump also mounted in the housing. The speed and direction of travel of the windrower are controlled by adjusting the displacement of the pumps and motors in the respective hydrostatic drives and the fluid pressure is respectively supplied to the two separate platform adjusting cylinders from the separate charge pumps.

---

This invention relates to a hydraulic drive and controls for a self-propelled agricultural vehicle and more particularly to a hydraulic system for driving and steering a self-propelled windrower or the like and controlling the position of the harvesting apparatus thereon.

It is known to utilize a hydrostatic type transmission to drive a pair of laterally spaced drive wheels on a self propelled windrower or the like and further to provide individual hydrostatic motors for the drive wheels, the vehicle being steered by controlling the relative speeds and directions of rotation of the drive wheels. When the wheels are driven at different speeds in the same direction, a gradual turning is achieved, while stopping one wheel and driving the other results in a pivotal turn about the stopped wheel. A pivot turn about a point between the drive wheels is also obtained by driving the wheels in opposite directions. The various types of turns provide a maximum degree of maneuverability, which is necessary for windrowers to allow the windrower to make square corners or pivot type turns.

However, in previous hydrostatic windrower drives, the separate wheel motors have generally been series connected, requiring a pressure on the high pressure side of the system equal to the sum of the pressure drops across the motors, the relatively high operating pressures requiring stronger components and creating a greater maintenance problem. Moreover, in downhill operation of the windrower and at certain occasions, the motors are used to brake the wheels, and instead of a pressure drop across the motors, there is a pressure rise, which affects the fluid flow in the circuit and the control thereof. Thus, with many previous hydrostatic drive windrowers, there has been a problem with downhill steering and control of the windrower.

The primary object of the present invention is to provide two separate hydraulic drives for driving the respective drive wheels on a windrower, and further to provide a hydrostatic drive system for a windrower or the like having a reduced operating pressure and also having control characteristics unaffected by a torque reversal in the system.

Another important object is to provide such individual hydrostatic drives wherein each drive includes a pump and a motor connected in a single closed loop and is contained in a single housing to eliminate the expense and maintenance problems associated with exposed hydraulic lines.

Another object is to provide such dual hydrostatic drives with separate charge pumps for the separate drives and further to provide such charge pumps coaxial with and mounted in the same housing with the main hydraulic pumps.

Another important feature resides in the use of the charge pumps as a source of fluid pressure for hydraulically controlling the position of the header and components thereon, and more specifically, in the use of the separate charge pumps to respectively supply fluid pressure for separate circuits which control the opposite ends of the header, permitting independent vertical adjustment of the opposite ends of the header.

The invention also features the utilization of a single, simple, and compact power distribution transmission mounted in a sealed housing and having an input approximately in line with and driven by the engine output shaft and dual pair of output shafts respectively coaxial with and drivingly connected to the main pumps in the separate hydrostatic drives, one of the shafts also serving as a drive shaft for a belt drive which drives the harvesting mechanism on the header.

Still another object resides in the provision of a compact, simple, and efficient arrangement of the drive system components, specifically in the provision of similar L-shaped housings for the individual hydrostatic drives, each drive having its pumps housed in one leg of the housing axially parallel with the engine shaft and its motors mounted in the other leg of the housing, axially parallel and extending toward the individual drive wheels.

These and other objects will become apparent from the following detailed description and accompanying drawings wherein:

FIG. 2 is a side elevation of the traction unit portion of the windrower with the near drive wheel and part of the operator's station omitted and a part of the body broken away to show a portion of the drive system.

FIG. 3 is a plan view of the traction unit with most of the windrower body removed to more clearly show the drive system.

FIG. 5 is a schematic illustration of the windrower drive and header controls.

Figure 1:
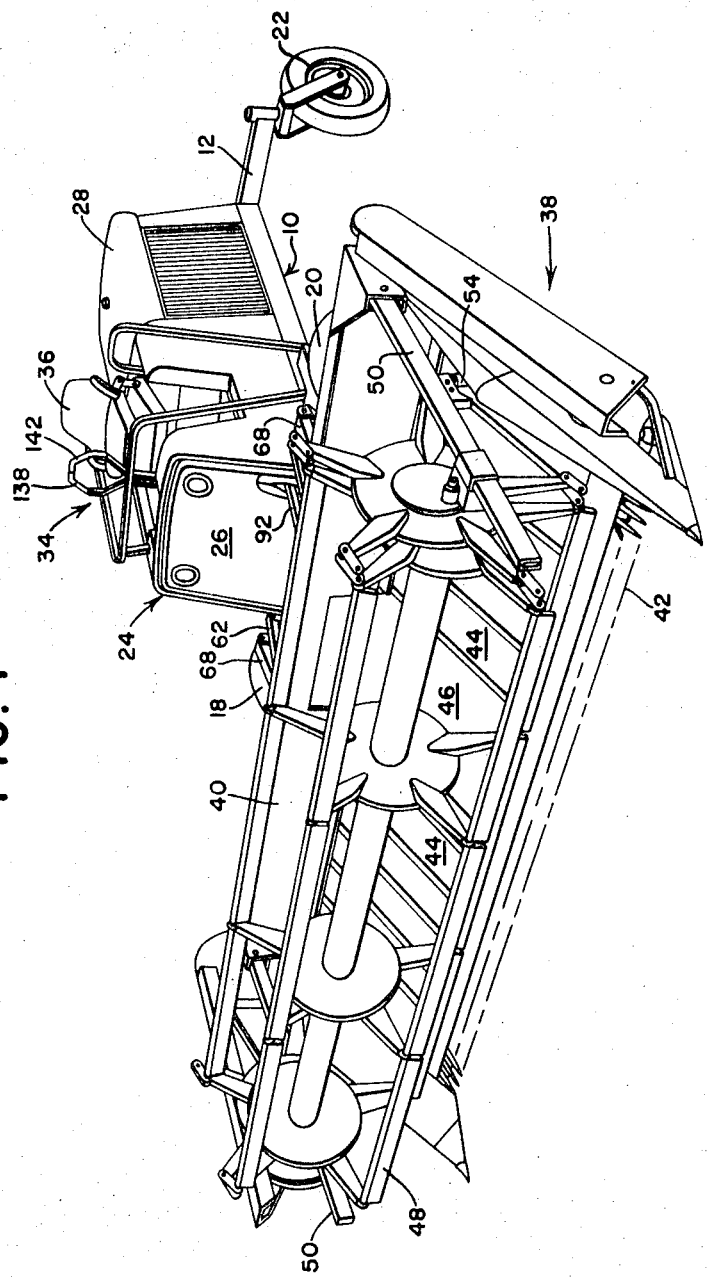
FIG. 1 is a left front perspective of a self-propelled windrower in which the invention is embodied.

The windrower chosen for purpose of illustration includes a fore-and-aft main frame 10, which includes a transverse rear beam 12, swingable about a fore-and-aft axis, and a hollow, transverse forward beam 13, at the opposite ends of which right and left wheel support structures 14 and 16 are respectively attached. The main frame 10 is supported above the ground on right and left front wheels 18 and 20, respectively journaled in the right and left wheel supports 14 and 16, and a pair of caster wheels 22 mounted on the opposite ends of the rear beam structure 12. Such words as "right," "left," "forward," and "rearward" are with reference to a person facing the forward end of the machine (to the left in FIGS. 2 and 3 and upwardly in FIG. 5), and it is to be understood that such terms, as well as terms such as "upper," "lower," etc., are words of convenience, used to more clearly describe the invention and are not to be construed as limiting phrases.

Mounted on the frame is a traction unit body, indicated in its entirety by the numeral 24 and including a transverse upright front panel 26 and a reaward engine enclosure or hood 28, under which an internal combustion engine 30 is mounted on the frame, the engine 30 having a forwardly extending output shaft 32. An operator's station, indicated in its entirety by the numeral 34, is located on the frame forwardly of the engine enclosure 28 and immediately rearwardly of the front body panel 26, the operator's station including a seat 36 of conventional construction.

A forwardly disposed, transversely elongated harvesting device or header 38, here shown as a draper-type windrower platform, includes a transversely elongated header frame or body 40, the opposite ends of which extend transversely beyond the wheels 18 and 20. An elongated cutting mechanism 42 extends along the leading edge of the header 38 and severs the crop as the machine advances, the severed crop moving rearwardly over the cutting mechanism to a pair of draper-type conveyors 44, the upper runs of which move inwardly to converge the crop to a central discharge opening 46, through which the crop drops back onto the ground in a window on top of the crop stubble. A transversely elongated reel 48 is disposed above the cutting mechanism 42 and combs the crop rearwardly over the cutting mechanism onto the conveyors 44. The reel 48 is mounted for vertical adjustment relative to the cutting mechanism on a pair of forwardly extending reel arms 50 pivotally connected to the header frame 40 at their rearward end for swinging in a vertical arc, the position of the reel support arms 50 being simultaneously established by a right or master reel lift cylinder 52 acting between the header frame and the right support arm and a left or slave reel lift cylinder 54 acting between the header frame and the left reel support arm, the reel lift cylinders 52 and 54 being connected for movement in unison by a hydraulic line 56 as schematically shown in FIG. 5.

The harvesting device or header 38 is mounted for generally vertical adjustment relative to the main frame 10 on a parallel type mounting mechanism 58 which includes a pair of parallel lower links 60 pivotally connected at their forward ends to the header frame 40 on transversely aligned pivots and pivotally connected at their rearward ends to the right and left wheel support structures 14 and 16 respectively, the rear pivots also being transversely aligned. The mounting mechanism also includes a pair of upper links 62 substantially parallel to the lower links 60 and pivotally connected at their forward ends to the header frame 40 on transversely aligned pivots and at their rearward ends to the front beam portion 13 of the main frame 10 on transversely aligned pivots, the upper links 62, like the lower links 60, extending forwardly from the opposite sides of the main frame. Sufficient play is provided at the pivot connections of the upper and lower links with the main frame 10 and header frame 40 to permit a substantial degree of vertical adjustment of one end of the header relative to the other, so that the header is permitted to tilt to a substantial degree about a fore-and-aft axis.

A right-hand hydraulic cylinder 64 has one end pivotally connected to the right wheel support structure 14 and its other end to the right-hand lower links 60 by means of a series connected tension spring 66 and guide arm 68, which has its rear end pivotally connected to the front beam 13 for swinging of the arm in a vertical arc, the spring 66 being connected to the forward end of the arm and the cylinder 64 being connected to a central portion of the arm. Similarly, a left-hand hydraulic cylinder 70 is pivotally connected at one end to the left wheel support 16 and has its opposite end connected to the left lower link 60 via a second series connected tension spring 66 and guide arm 68. The lifting force exerted by the right- and left-hand cylinders 64 and 70 are thus transmitted to the header frame by the guide arms 68, the tension springs 66, and the lower links 60, the springs 66 preferably being provided with a stop means (not shown) for limiting their deflection when supporting the header, the deflection of the springs providing a force for counterbalancing the weight of the header and permitting upward floating movement of the header. The right- and left-hand cylinders 64 and 70 are independently actuatable, as will be described herein, and consequently can be utilized to independently position the opposite ends of the header.

Figure 4:
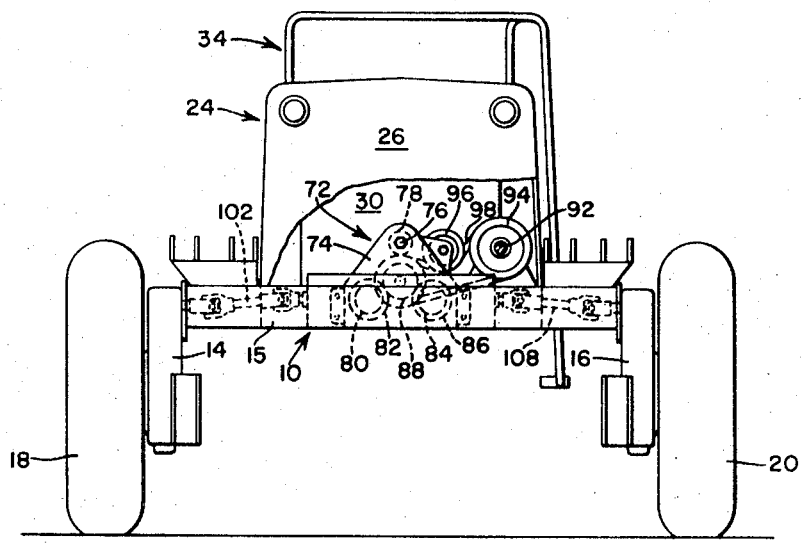
FIG. 4 is a front elevation of the traction unit with a portion of the front panel of the windrower body removed and omitting part of the operator's station.

Mounted on the main frame 10 below the operator's station 34 is a power distribution box or transmission, indicated in its entirety by the numeral 72, including an upright, generally triangular housing 74, having a transversely horizontal base. The transmission 72 includes a fore-and-aft input shaft 76, journaled in the housing 74 and connected to and driven by the engine output shaft 32, a spur gear 78 mounted on the input shaft 76, a right output shaft 80 on which a gear 82 is mounted, a left output shaft 84 on which a gear 86 is mounted, and counter gear means 88 drivingly connecting the input gear 78 to the output gears 82 and 86, the input and output shafts rotating in the same direction. The triangular relationship of the transmission shafts about the counter gear means 88 is best seen in FIG. 4. A V-belt drive sheave 90 is also attached to the input shaft 76 on the rearward side of the housing 74, and a header drive shaft 92 is journaled on the main frame parallel to the engine output shaft 32, the shaft 92 extending forwardly through the front body panel 26 and being connected to the cutting mechanism 42, the conveyors 44, and the reel 48 for driving said components. A driven V-belt sheave 94 is mounted on the shaft 92 and an idler sheave 96 is journaled on the housing 74, an endless driving element or belt 98 being trained around the drive sheave 90, the idler sheave 96, and the driven sheave 94 to drivingly connect the shaft 32 to the header drive shaft 92.

The right output shaft 80 functions as the input shaft for a right hydrostatic drive 100, mounted on the frame and having a transverse output shaft 102 which drives the right wheel 18 through a right final drive 104 mounted in the right supporting structure 14, the right final drive being schematically shown in FIG. 5. Similarly, the left output shaft 84 serves as the input shaft for a left-hand hydrostatic drive 106 having a transversely extending output shaft 108, which drives the left drive wheel 20 through a left final drive 110 mounted in the left wheel supporting structure 16.

The right and left hydrostatic drives 100 and 106 are identical and are mounted in substantially identical L-shaped housings 112 and 114 mounted on the frame 10 between the distribution box or transmission 72 and the front beam member 13. As best seen in FIG. 3, the housings 112 and 114 are mirror images of each other and are formed by three separable portions to facilitate access to and maintenance of the drive components, the housings respectively including first or rearwardly extending leg portions 116 and 118, second or transversely extending leg portions 120 and 122, which extend toward the drive wheel with which they are associated, and intermediate or corner portions 124 and 126. The rearwardly extending legs 116 and 118 respectively house a pair of variable delivery main pumps 128 and smaller constant delivery charge or auxiliary pump 130, the pumps in the right drive being coaxially attached to and driven by the shaft 80 and the pumps in the left drive being coaxially attached to and driven by the shaft 84. A pair of variable delivery motors 132 is respectively housed in the transverse leg portions 120 and 122, the motor in the right housing being drivingly connected to the right drive shaft 102, while the motor in the left housing is drivingly connected to the left drive shaft 108. The motors 132 are respectively connected to the main pumps by main hydraulic conduits or lines 134, which connect the respective pumps and motors in a closed loop. The main lines 134 respectively extend through the intermediate or corner portions 124 and 126 of the right and left housings, said corner portions also enclosing the hereinafter described charge circuit lines and valving.

The displacement of the main pump 128 in the right hydrostatic drive 100 is established manually through a control mechanism 136, including a right control handle 138 movable in an upright fore-and-aft arc at the operator's station 34, while the displacement of the main pump 128 in the left drive 106 is established manually through a left control mechanism 140, including a left control handle 142 movable in a fore-and-aft vertical arc adjacent to the right control handle 138. The pumps 128 are preferably of the well-known axial piston type having a reversible swash plate, the direction and volume of flow from the pumps depending on the position of the swash plate as established by the respective control mechanisms. Only a portion of the linkage in the control mechanism is illustrated in FIG. 3. The motors 132 are also preferably of the axial piston type, the angle of the swash plate being adjustable to vary the displacement of the motor and consequently the speed thereof for any given volume of flow. However, in the preferred embodiment, only two alternate motor displacement settings are provided to provide only a high and low range variation in speed by the motors, the infinite speed variation within the alternate ranges provided by the motors being accomplished by adjustment of the pump displacement. The displacement of the respective motors is also preferably established through manually actuated control mechanisms 144 of conventional construction, the motor control mechanisms 144 also being accessible to the operator from the operator's station, although the location of the controls is not illustrated, only a portion of the control mechanism linkages being shown in FIG. 3.

The charge pumps 130 have inlet lines 146 connected to a common reservoir 148, preferably formed by the cavity in the front beam member 13, and outlet lines 150 connected to differential relief type valves 152. The valves 152 maintain a preselected minimum pressure (approximately 25 p.s.i. in the preferred embodiment) in charge lines 154, which are connected across the main conduits 134 on opposite sides of the main pumps 128, thereby preventing cavitation in the charge circuits. A pair of check valves 158 in each line 154 is interposed between the valve 152 and the main conduit connections to permit fluid flow from the lines 154 to the low pressure side of the main hydrostatic conduits 134 only when the main conduit pressure is less than the pressure in the line 154. Of course, the low pressure side of the loop depends on the flow direction from the main pumps. A pair of high pressure relief valves 160 is connected to each main conduit 134 on opposite sides of the main pumps to dump the main conduits into the high pressure lines 154 whenever the pressure exceeds a predetermined value, thereby bypassing the motors 132 if an excessive wheel resistance causes excessive pressure. The high pressure relief valves in the preferred embodiment are set to bypass the motors when the pressure exceeds 5000 p.s.i., and thereby protect the drive system components.

The valves 152 direct fluid in excess of the amount required to charge the main conduits to secondary outlet lines 156 which extend to the exterior of the housings 112 and 114 and serve as respective fluid pressure sources for right and left hydraulic control systems 162 and 164, which are actuated by the operator from the operator's station. The right control system 162 includes a relief valve 166 which opens to dump the line 156 from the right hydrostatic drive 100 to a sump line 168 whenever the pressure in the line exceeds a predetermined pressure, the valve 166 being set for a relief pressure of approximately 2000 p.s.i. in the preferred embodiment to protect the circuit controlled by the right control system 162. The right control system 162 includes a control valve 170 which is manually operated to selectively supply fluid pressure to the right-hand platform lift cylinder 64 from the line 156 or to exhaust the cylinders 64 to the sump line 168. The control valve 170 is of the open-center type so that it bypasses fluid from the line 156 to the sump line 168 in its neutral condition. The left-hand control system 164 also includes a relief valve 172 connected to the high pressure line 156 from the left hydrostatic drive 106, the relief valve 172, like the valve 166, being set to dump the line 156 to a second sump line 174 when the pressure exceeds a predetermined value. The left-hand control system also includes a platform control valve 176 of the open-center type, which is selectively actuated by the operator to pressurize the left-hand hydraulic cylinder 70 or to exhaust the cylinder 70 to a line 175, the valve also dumping the line 156 to the line 175 in its normal or neutral condition as shown in FIG. 5. The left-hand control system 164 also includes a second control valve 178, similar to and connected in series with the control valve 176, the line 175, which is pressurized except when the platform cylinder 70 is being actuated, serving as the inlet line for the valve 178. The valve 178 selectively pressurizes or exhausts the reel lift cylinder 52 via the line 180, the valve also being of the open-center type and connected to the sump line 174 via a line 179.

The sump lines 168 and 174 merge into a line 181 which flows through a filter 182, a heat exchanger 184, and a relief valve 186, upstream of the heat exchanger for dumping the line 181 directly to the reservoir via the line 188 if the resistance to flow in the heat exchanger and the downstream portions of the system creates a pressure drop in excess of a predetermined amount, the valve 186 being set for approximately 50 p.s.i. in the preferred embodiment. The sump line 181 divides into right and left branches 190 and 192 on the downstream side of the heat exchanger 184, the right branch 190 passing through the right housing 112 around the motor 132 and the pump 138 before it dumps to the reservoir 148, and the left branch 192 similarly passing through the left housing 114 around the motor and pump before dumping to the reservoir 148. Since the charge pumps 130 are of the constant delivery type and the valves 170 and 176 are of the open-center type, there is a constant fluid flow through the sump lines, the fluid in the lines 190 and 192 circulating through the housings 112 and 114 functioning as a heat transfer medium to cool the motors and pumps during their operation. In cold weather, when the fluid in the lines 190 and 192 is relatively viscous, a relatively large pressure drop will occur in the lines 190 and 192, causing the relief valve 186 to open, bypassing the fluid directly to the reservoir and consequently permitting an accelerated warm-up of the hydrostatic drive circuits.

In operation, when the control handles 138 and 142 are placed in their neutral position, as shown in FIG. 5, a zero displacement condition is obtained in the pumps 128, resulting in a zero flow in the main conduits 134, locking the motors 132 and the drive wheels 18 and 20 respectively attached thereto. When the control handles are moved in either direction in unison, the displacement in the two main pumps 128 is identical, producing the same rate and direction of fluid flow in the lines 134 so that the motors 132 and the drive wheels 18 and 20 respectively attached thereto rotate at the same speed and in the same direction, driving the windrower in a straight line. Of course, the direction and speed of the windrower depend on how far and in what direction the control handles 138 and 142 are moved from the neutral position, forward movement of the control handles in the illustrated embodiment (upwardly in FIG. 5) producing a positive displacement in the pumps 128 and a resulting forward motion of the windrower, while rearward movement of the handles 138 and 142 produces a negative displacement in the pumps with a resulting reverse movement of the windrower. As previously described, the ground speed of the windrower can also be varied for any given position of the control handles 138 and 142 and resulting pump displacement, by mechanically shifting the position of the swash plates in the motors 132 via the motor control mechanisms 144, the motor swash plates in the preferred embodiment having only two alternate positions to provide two speed ranges for the windrower, although a larger number of speed ranges, or even an infinite number of speed ranges, could be provided by providing a larger number of swash plate positions or by providing infinite variation in the motor displacement. The motor displacements could also be controlled hydraulically, or by a servo control system to automatically control the speed of the windrower.

For a trim type right turn of the windrower, the operator twists his hand in a clockwise direction or to the right while grasping both control handles 138 and 142, (the operator facing forwardly or upwardly in FIG. 5) thereby moving the left control handle 142 forwardly relative to the handle 138 and causing a greater pump displacement in the left-hand hydrostatic drive 106 than in the right-hand drive 100, so that the left-hand drive wheel 20 is driven at a greater rate than the right-hand wheel 18 and causes a right-hand turning of the windrower.

For a pivot turn about one of the drive wheels, the control handle for the pivot wheel is moved to the neutral position, producing a zero displacement in the particular pump and a resulting zero speed for the drive wheel. The other control handle is moved in a forward or reverse direction, depending on whether a forward or reverse pivot is desired. If a more abrupt pivot is desired, wherein the windrower pivots about a point between the drive wheels 18 and 20, one control handle is set in a forward position while the other is set in a rearward position, resulting in forward rotation of one drive wheel and reverse rotation of the other drive wheel, pivoting the windrower about itself.

The above-described methods of steering and speed control produce a maximum degree of maneuverability and speed variation, which is very important in a windrower. As is also apparent from the above, the ground speed and steering of the windrower can be controlled by one hand of the operator, leaving the operator's feet and other hand available for other control functions of the windrower. As is also apparent, a torque reversal in the drives, such as is obtained when the drive wheels are being used to brake the vehicle during downhill operation of the vehicle, does not affect the drive system controls and consequently the steering of the vehicle, since each pump and motor is in a closed circuit independent of the circuit on the opposite side of the machine, the motor in each circuit acting as a pump during the torque reversal while the main pumps 128 act as motors which are braked by the internal combustion engine 30.

The charge pumps 130 provide a source of fluid pressure for other hydraulic control functions on the windrower, the separate pumps serving as separate pressure souces for independent control of the opposite ends of the harvesting device or header 38, thereby permitting the operation of the header in a tilted condition so that the windrower is able to harvest crops growing on elevated areas, such as irrigation channels or the like.

As is apparent from the drawings, the entire drive system is compact and located on the windrower to permit relatively simple control linkages as well as easy access for service. Since each hydrostatic drive is mounted in a single housing, there are no exposed lines in the hydrostatic drives and the drives may be easily removed for maintenance.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a vehicle having a mobile main frame, right and left transversely spaced drive wheels independently journaled thereon, a power source mounted on the frame, and a working part carried by the frame for vertical adjustment relative thereto, the combination therewith of a hydraulic system for driving and steering the vehicle and controlling the position of the working part on the frame comprising: first and second independent hydrostatic drives respectively drivingly connecting the power source to the right and left drive wheels, each drive including a motor drivingly connected to the respective wheel, a main pump connected to and driven by the power source, and conduit means operatively interconnecting the main pump and motor and an independently closed loop; a first and a second control means operatively and respectively associated with the first and second hydrostatic drives for respectively controlling the speed and direction of rotation of the right and left drive wheels; a fluid reservoir, an auxiliary pump means connected to and driven by the power source for supplying fluid from the reservoir to the hydrostatic drives; a hydraulic cylinder means operative between the frame and the working part for vertically adjusting the working part relative to the frame; and control valve means operatively connected to the cylinder means and the auxiliary pump means for selectively actuating the cylinder means.

2. The invention defined in claim 1 wherein the auxiliary pump means includes a first charge pump connected to the first hydrostatic drive and a second charge pump connected to the second hydrostatic drive, and the working part is transversely elongated and mounted on the frame for independent vertical adjustment of its opposite end portions thereon, the hydraulic cylinder means includes first and second hydraulic cylinders operative between the frame and transversely spaced points on the working part for respectively adjusting the opposite ends of the working part, and the control valve means includes first and second control valves respectively operative to selectively supply fluid pressure from the first and second charge pumps to the first and second cylinders for independent actuation of the cylinders and vertical adjustment of the opposite ends of the working part.

3. A self-propelled windrower comprising: a mobile main frame; a forwardly disposed transversely elongated harvesting device; means for mounting the harvesting device on the frame for generally vertical adjustment of the harvesting device relative to the frame; right and left transversely spaced independently rotatable drive wheels journaled on the frame; a power source mounted on the frame; first and second independent hydrostatic drives respectively drivingly connecting the power source to the right and left drive wheels, each drive including a variable displacement hydraulic motor drivingly connected to the respective wheel, a variable displacement hydraulic pump connected to and driven by the power source, and conduit means operatively interconnecting the pump and motor in each drive in a closed loop; charge pump means operatively connected to the respective closed hydrostatic loops of the first and second hydrostatic drives for supplying fluid thereto; hydraulic cylinder means operative between the frame and the harvesting device for adjusting the harvesting device relative to the frame; control valve means operative to supply fluid pressure from the charge pump means to the hydraulic cylinder means for effecting vertical adjustment of the harvesting device; and first and second control means operatively and respectively associated with the first and second hydrostatic drives for respectively controlling the speed and direction of rotation of the right and left drive wheels.

4. The invention defined in claim 3 wherein the charge pump means includes first and second separate charge pumps connected to and driven by the power source and having outlet lines respectively connected to the closed hydrostatic loops of the first and second hydrostatic drives for supplying fluid thereto.

5. The invention defined in claim 4 wherein the means for mounting the harvesting device on the frame includes means for vertically adjusting the opposite ends of the harvesting device separately or in unison and the hydraulic cylinder means includes first and second independently actuatable hydraulic cylinders operative between the frame and the harvesting device at transversely spaced points for respectively vertically adjusting the opposite end portions of the harvesting device, and the control valve means includes first and second control valves respectively operative to selectively and independently supply fluid pressure to the first and second hydraulic cylinders from the first and second charge pumps for effecting independent vertical adjustment of the opposite ends of the harvesting device.

6. The invention defined in claim 3 wherein the first and second control means respectively include displacement varying means for independently controlling the displacement of and direction of flow through the respective pumps.

7. The invention defined in claim 6 wherein the hydraulic motors in the first and second hydraulic drives each have alternate displacement conditions providing alternate drive ratios in the respective hydrostatic drives for any given condition of displacement of the respective pumps, and the first and second control means respectively include means for varying the displacement in the respective motors.

8. A self-propelled vehicle comprising: a mobile main frame; right and left, transversely spaced, independently rotatable drive wheels journaled on the frame; a power source mounted on the frame; first and second independent hydrostatic drives respectively drivingly connecting the power source to the right and left drive wheels, each drive including a hydraulic motor drivingly connected to the respective wheel, a main pump connected to and driven by the power source, conduit means operatively interconnecting the main pump and motor in each drive in a closed loop, and a charge pump connected to and driven by the power source and including an outlet line connected to the conduit means; and first and second control means operatively and respectively associated with the first and second hydrostatic drives for respectively controlling the speed and direction of rotation of the right and left drive wheels.

9. The invention defined in claim 8 and including a forwardly disposed transversely elongated harvesting device, means for mounting the harvesting device on the frame for generally vertical adjustment of the opposite transversely spaced end portions of the harvesting device separately or in unison, first and second independently actuable hydraulic cylinders operatively between the frame and the harvesting device at transversely spaced points for respectively vertically adjusting the opposite end portions of the harvesting device, and first and second control valves respectively operative to selectively and independently supply fluid pressure to the first and second hydraulic cylinders from the charge pumps in the first and second hydrostatic drives for effecting independent vertical adjustment of the opposite end portions of the harvesting device.

10. A self-propelled harvester comprising: a mobile main frame; right and left transversely spaced independently rotatable drive wheels journaled on the frame; a power source mounted on the frame; first and second hydrostatic drive housings mounted on the frame; first and second independent hydrostatic drives respectively mounted within the first and second drive housings and drivingly connecting the power source to the right and left drive wheels, each drive including a main pump connected to and driven by the power source, a hydraulic motor connected to the respective drive wheel, and conduit means interconnecting the main pump and motor in each drive in a closed loop; and first and second control means operatively and respectively associated with the first and second hydrostatic drives for respectively controlling the speed and direction of rotation of the right and left drive wheels.

11. The invention defined in claim 10 wherein the power source includes a fore-and-aft output shaft and the hydrostatic drive housings are generally L-shaped and include a fore-and-aft extending portion in which the main pump of each drive is mounted axially parallel to the power source output shaft and a transversely extending portion which extends laterally toward the wheel with which the respective drive is associated and housing the hydraulic motor, the axis of the motor being parallel to the axis of the wheel.

12. The invention defined in claim 11 wherein each hydrostatic drive also includes a charge pump mounted in the housing.

13. A self-propelled harvester comprising: a mobile main frame; right and left transversely spaced independently rotatable drive wheels journaled on the frame; an internal combustion engine mounted on the frame and including a fore-and-aft output shaft; a power distribution means mounted on the frame and including a housing, an input shaft journaled in the housing substantially coaxial with and drivingly connected to the engine output shaft, a pair of output shafts journaled in the housing parallel to the input shaft, and gear means within the housing drivingly connecting the input shaft to the output shafts; a pair of main hydraulic pumps having drive shafts respectively coaxial with and drivingly connected to the power distribution means output shafts; a pair of hydraulic motors respectively connected to the right and left drive wheels; hydraulic conduit means operatively connecting one main pump to one motor, and the other main pump to the other motor, whereby the connected pumps and motors form independent hydrostatic drives for the opposite drive wheels; and first and second control means operatively and respectively associated with the separate hydrostatic drives for respectively controlling the speed and direction of rotation of the right and left drive wheels.

14. The invention defined in claim 3 and including a pair of L-shaped hydrostatic drive housings mounted on the frame forwardly of the power distribution means, each housing including a fore-and-aft leg portion in which the main pump is mounted and a transversely extending portion in which the hydraulic motor is mounted.

References Cited

UNITED STATES PATENTS

| 2,796,717 | 6/1957  | Orelind et al  | 56—209    |
| 3,065,590 | 11/1962 | Knollman       | 56—209    |
| 3,246,715 | 4/1966  | Pool et al.    | 180—6.3 XR |
| 3,351,147 | 11/1967 | Williamson     | 180—6.3   |

ANTONIO F. GUIDA, Primary Examiner

U.S. Cl. X.R.

180—6.3